INVENTORS
Junji Yamato
Tamio Shimizu
Giro Iimura
BY
Watson, Cole, Grindle & Watson
ATTORNEYS INVENTORS
Junji Yamato
Tamio Shimizu
Jiro Imura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS INVENTORS
Junji Yamato
Tamio Shimizu
Jiro Imura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS INVENTORS
Junji Yamato
Tamio Shimizu and
Jiro Simura
BY Watson, Cole, Grindle & Watson
ATTORNEY INVENTORS
Junji Yamato
Tamio Shimizu
Jiro Iimura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS INVENTORS
Junji Yamato
Tamio Shimizu
Jiro Iimura
BY Watson, Cole, Grindle & Watson
ATTORNEYS United States Patent Office 3,376,559

Patented Apr. 2, 1968

3,376,559

CAPACITATIVE READ-ONLY MEMORY DEVICE EMPLOYING PARALLEL BALANCED DRIVE AND SENSE LINES

Junji Yamato, Tamio Shimizu, and Jiro Iimura, Tokyo, Japan, assignors to Nippon Telegraph and Telephone Public Corporation, Tokyo, Japan, a public corporation of Japan Filed Jan. 25, 1965, Ser. No. 427,670
Claims priority, application Japan, Jan. 27, 1964, 39/3,733
5 Claims. (Cl. 340—173)

ABSTRACT OF THE DISCLOSURE

A semi-permanent memory device composed of a plurality of sensing and driving elements each comprising lines consisting of two parallel conductors electrically balanced with respect to a ground reference. The sensing and driving lines are electrically coupled with each other at cross-over portions by means of apertures positioned in a removable information storage card which is positioned between the sensing and driving elements. The sensing and driving elements may be combined in modular form to provide a memory device having increased storage capacity.

Figure 1A:
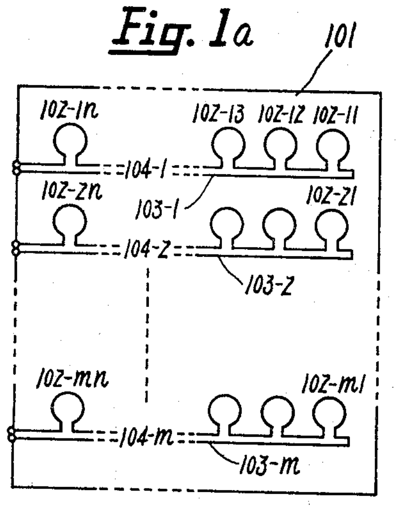

This invention relates to semi-permanent-memory devices adapted to be used, for example, in common control type automatic telephone exchanges or electronic computers.

One of the already well known semi-permanent memory devices is of such type as is disclosed in United States Patent No. 3,215,991 to one of the inventors of the present invention. The patent newly claimed herein relates to the improvements of the above mentioned United States patent.

An object of the present invention is to provide a semi-permanent memory device characterized by high speed, high signal to noise ratio, high reliability and ease of production.

A feature of the semi-permanent memory device according to the present invention is a memory device comprising a driving line board made by depositing electrically balanced parallel reciprocating lines on an insulative base plate by printed wiring or a similar method and a sensing line board formed on an insulative base plate in the same manner. The driving line board and sensing line board are opposed to each other to form an electric coupling of distributed constants between the sets of lines on both of the boards. A conductive card is also provided having holes selectively placed depending on the information to be stored and which is inserted in a clearance between the above mentioned opposed line boards so that the magnitude of the electric coupling between the opposed sets of lines is such that the information recorded on the card may be sensed.

Another feature of the semi-permanent memory device according to the present invention is that the ends of the electrically balanced parallel reciprocating line sets, deposited and formed on the insulative base plates, are terminated with surge impedances equal to the impedances of the line sets.

Yet another feature of the semi-permanent memory device is that the sensing line board is formed by the multiple folding of a ribbon-shaped cable made by depositing electrically balanced parallel reciprocating line sets on the surfaces of a flexible long insulative film by printed wiring or like method.

Still another feature of the semi-permanent memory device is that the driving line board is formed by depositing electrically balanced parallel reciprocating line sets on both surfaces of one common insulative base plate by printed wiring or the like method and connecting the line sets on the front and back surfaces with each other at one end.

A further feature according to the present invention is that the sensing line board is formed by adhering a flexible insulative film, on which are deposited electrically balanced reciprocating line sets by printed wiring or the like method, to an insulative base plate having conductive intermediate layers within, to achieve the same effect as if the lines were electrically located on a thick base plate having a shield plate.

Another feature of the present invention is to provide an information memory card made by insulatively coating a metal foil on both front and back surfaces and forming holes in the card or removing only part of the foil depending on the information to be stored.

An electrically balanced line as used in the present invention is one which consists of two parallel electrical conductors as forward and return paths consisting of the same conductive and insulative materials having the same mechanical dimensions and being disposed on an insulative plate or film at the same distances from one side of a conductive flat plate at ground potential. The electrical characteristics of these two parallel conductors to ground are equal to each other and the quality of distances may be neglected when the line is disposed far from the ground plate or reference.

Figure 1B:
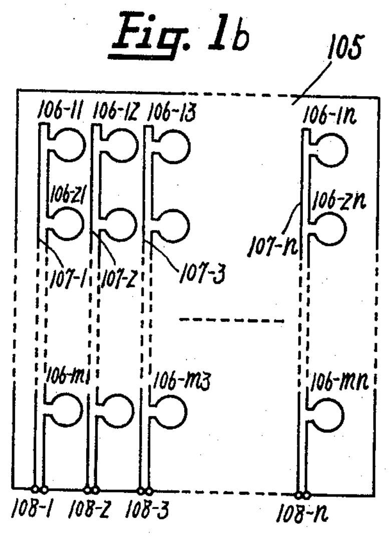
Figure 1C:
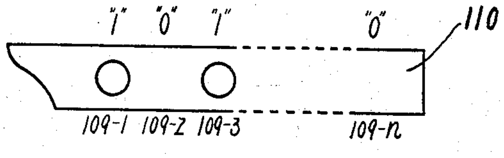
Figure 1D:
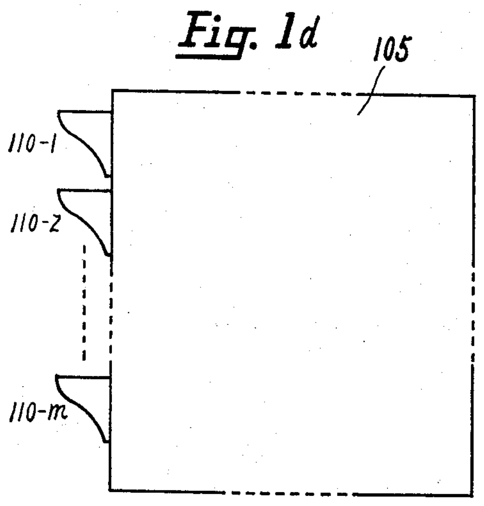
Figure 1E:
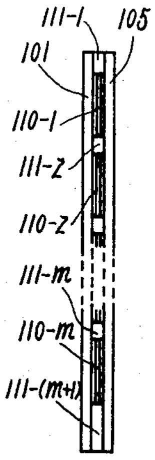
Figure 2A:
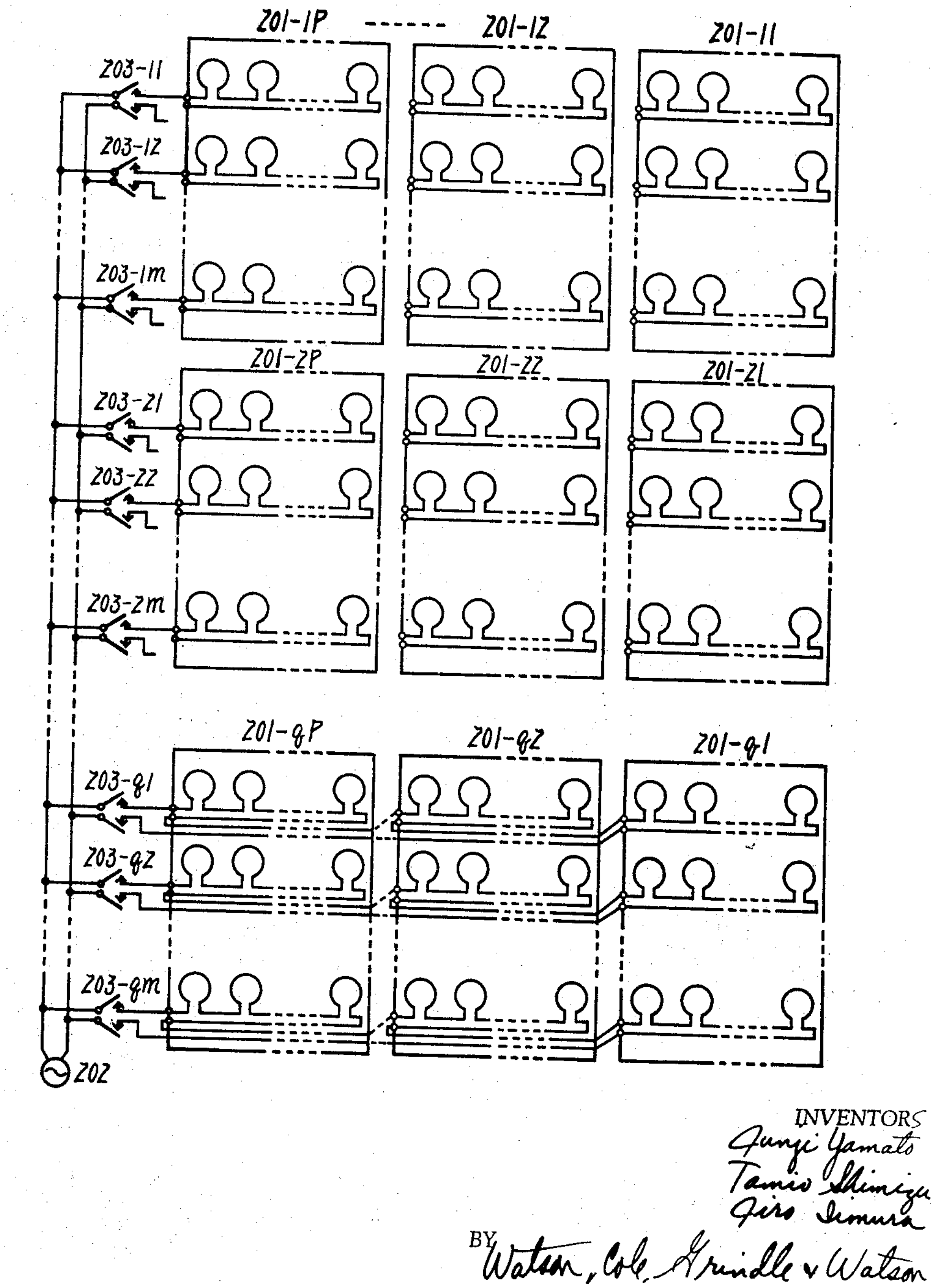
Figure 2B:
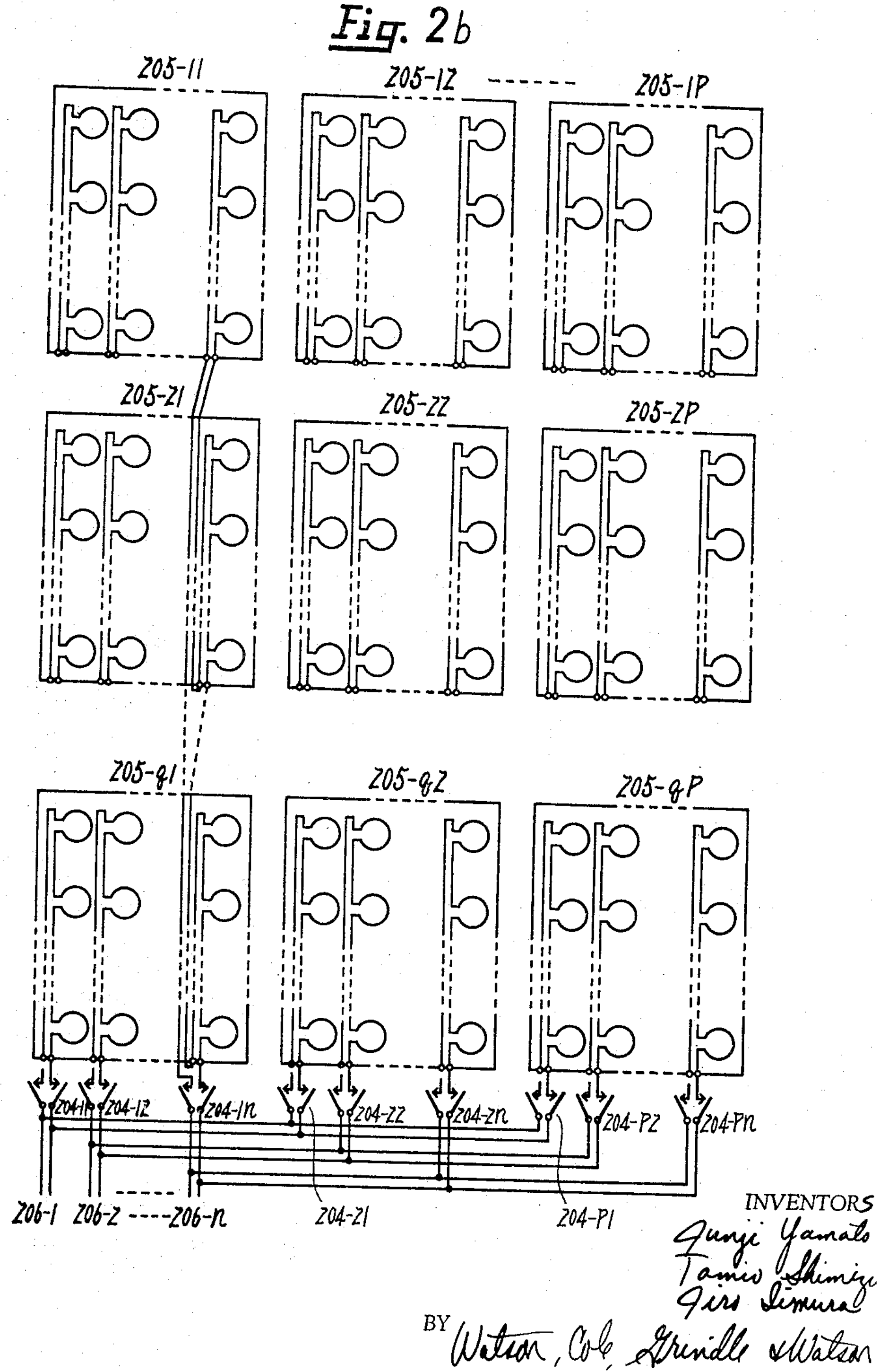
Figure 3:
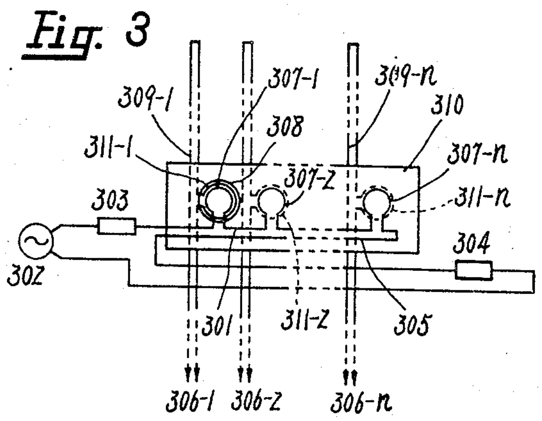
Figure 4A:
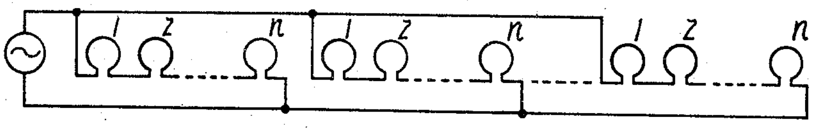
Figure 4B:
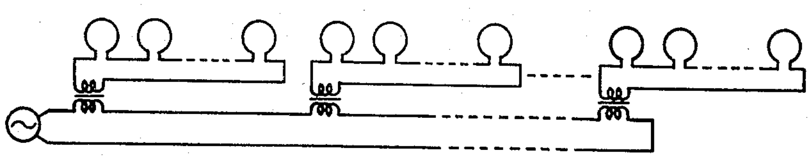
Figure 4C:
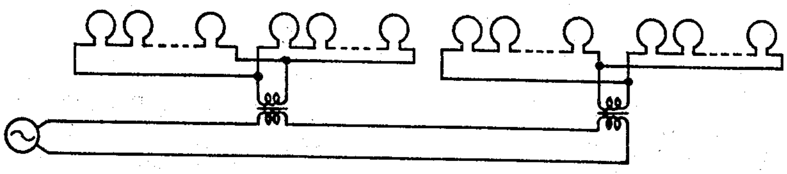
Figure 5A:
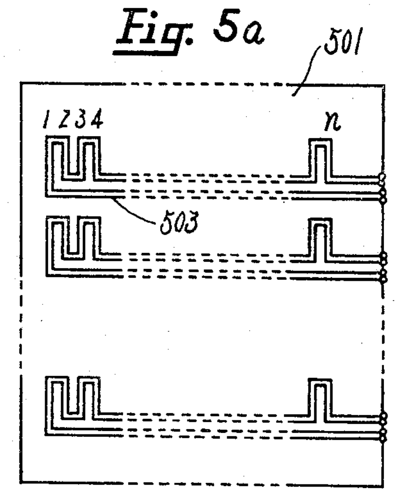
Figure 5B:
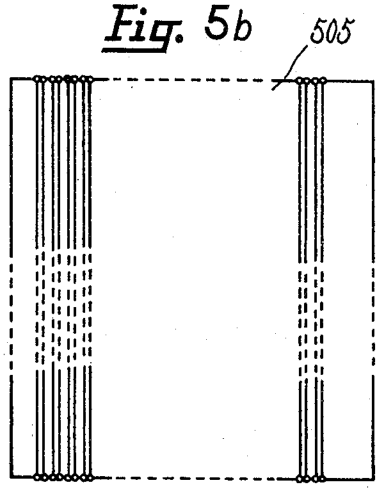
Figure 5C:
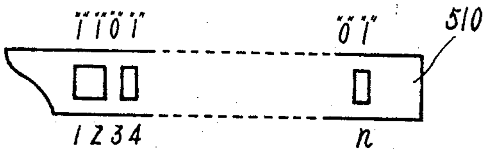
Figure 5D:
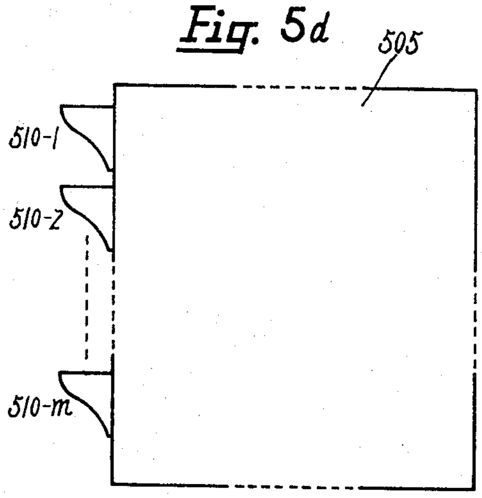
Figure 5E:
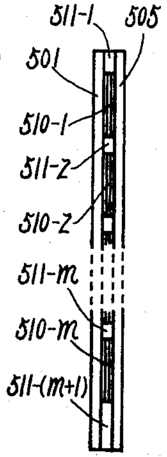
Figure 5F:
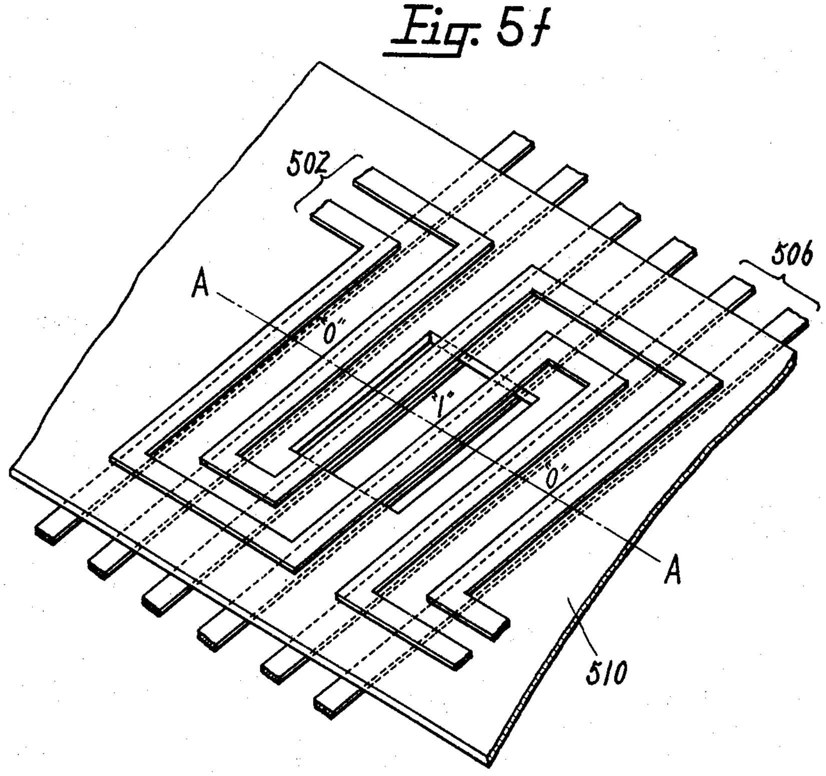
Figure 5G:
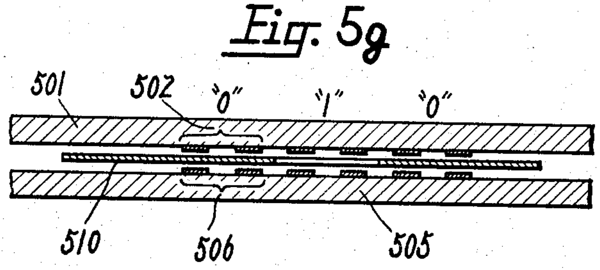
Figure 6A:
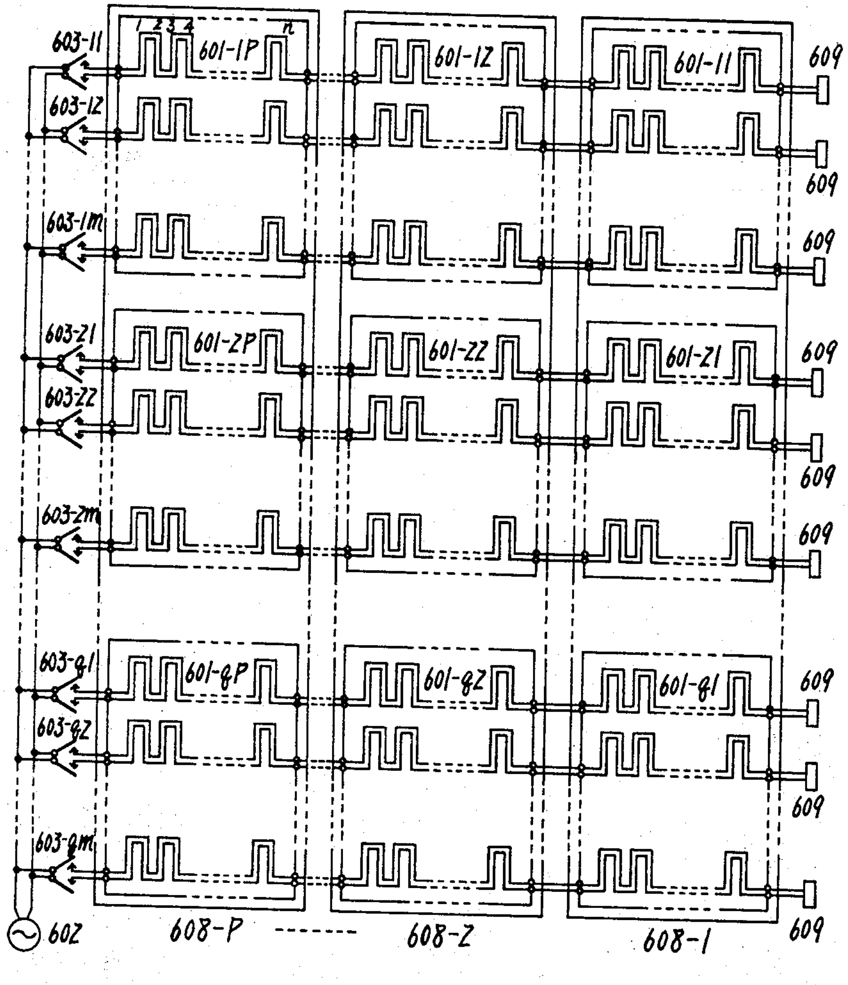
Figure 6B:
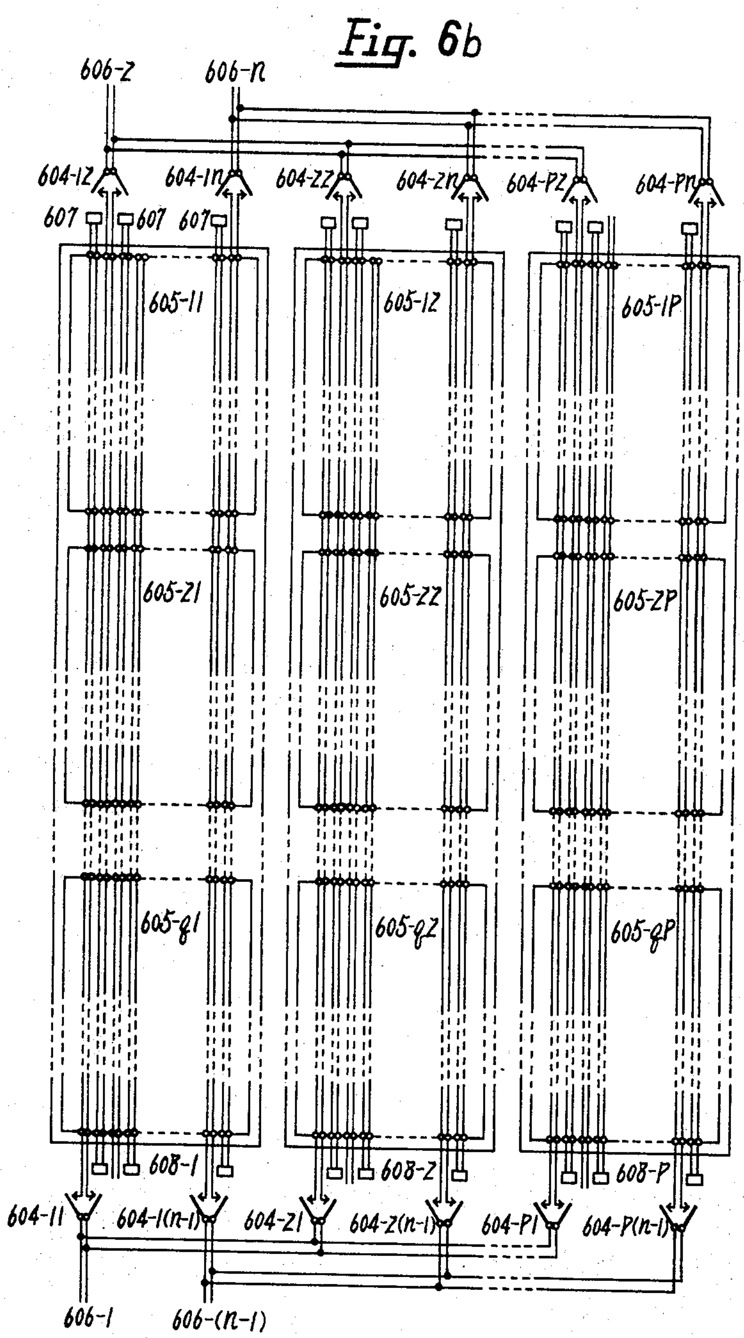
Figure 6C:
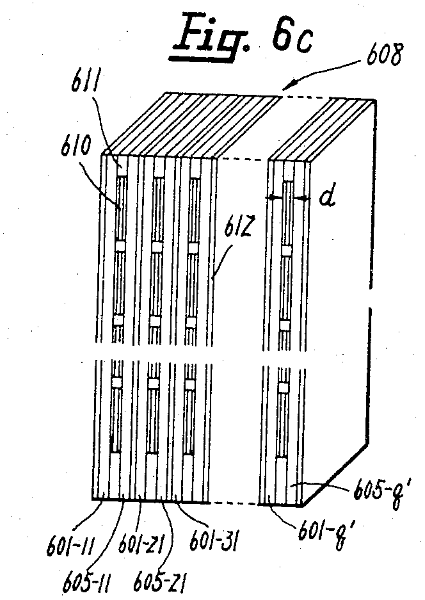
Figure 7A:
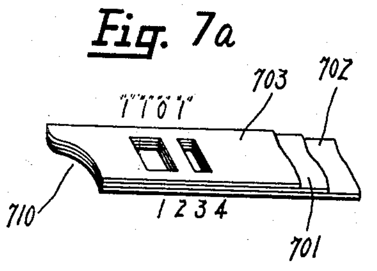
Figure 7B:
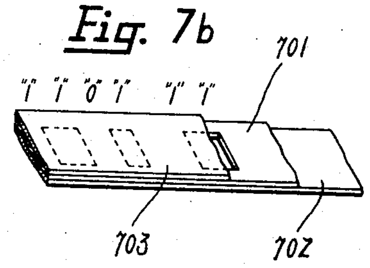
Figure 6D:
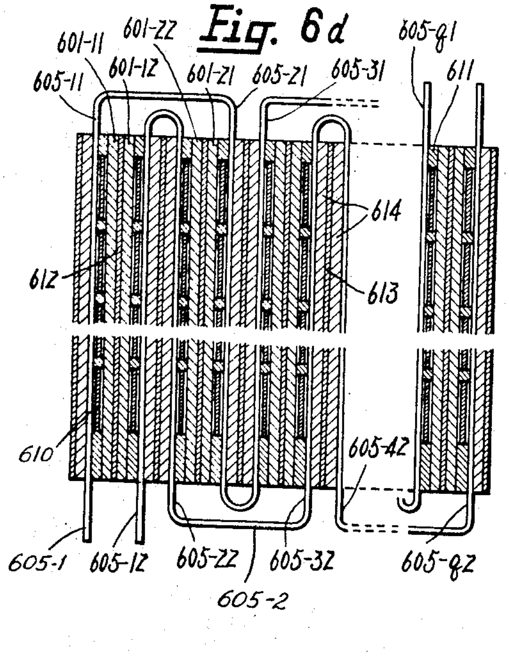
Figure 6E:
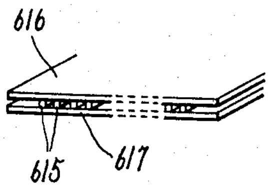

Specific embodiments of the invention will now be described by way of example with reference to the accompanying drawings in which:

FIGURES 1*a*, 1*b* and 1*c* illustrate respective main component elements of a known semi-permanent memory device;

FIGURES 1*d* and 1*e* illustrate an assembly of a known semi-permanent memory module;

FIGURE 2*a* illustrates the driving system of a known semi-permanent memory device with increased memory capacity;

FIGURE 2*b* illustrates the sensing system corresponding to FIGURE 2*a*;

FIGURE 3 is an equivalent circuit diagram of the known semi-permanent memory device;

FIGURES 4*a*, 4*b* and 4*c* illustrate three different methods of eliminating the defects of the known semi-permanent memory device;

FIGURES 5*a*, 5*b* and 5*c* illustrate an example of the main elements of a semi-permanent memory device embodying the present invention;

FIGURES 5*d* ond 5*e* illustrate an embodiment of the present invention formed by combining the main elements;

FIGURES 5*f* and 5*g* are a perspective view and a sectional plan view, respectively, of a coupling part shown in FIGURES 5*c*, 5*d* and 5*e*;

FIGURES 6*a* and 6*b* illustrate the driving system and the sensing system, respectively, of the memory block embodying the present invention;

FIGURE 6*c* is a perspective view of a memory block of an embodiment of the present invention made by connecting a plurality of the memory modules as shown in FIGURES 5*a*–5*e*;

FIGURE 6*d* is a side view of a memory block of an embodiment of the present invention;

FIGURE 6*e* illustrates an example of a structure forming a flexible sensing line film to be used for a memory device embodying the present invention;

FIGURES 7*a* and 7*b* are the structures of information memory cards to be used in semi-permanent memory devices embodying the present invention.

In order to clarify the differences between the semi-permanent memory unit according to the present invention in the already well known semi-permanent memory devices, the semi-permanent memory device of the type disclosed in U.S. Patent No. 3,215,991 will be described first.

FIGURES 1*a*, 1*b* and 1*c* illustrate respective main component elements of known semi-permanent memory devices and FIGURES 1*d* and 1*e* illustrate semi-permanent memory assemblies. FIGURE 1*a* illustrates a driving coil board 101 made by depositing *m* coil groups 104 consisting of series connections of as many driving coils 102 as the *n* bits forming one word. Returns 103 of the driving coils are connected in series (the *m* coil groups are respectively represented by 104–1 to 104–*m*; in this case, *m* words are contained in one base plate) on an insulative base plate by printed wiring or the like method.

FIGURE 1*b* illustrates a sensing coil board 105 made by depositing as many sensing coil groups 108 consisting of vertical series connections of as many sensing coils 106 as *m* words and their returns 107 as *n* bits forming one word (the *n* bits are respectively represented by 108–1 to 108–*n*) on an insulative base plate by printed wiring or the like method. Further, the coils 102–11 to 102–*mn* on the driving coil board 101 and the coils 106–11 to 106–*mn* on the sensing coil board 105 are respectively assembled in operative association to each other.

FIGURE 1*c* illustrates a conductive card 110 in which holes are made corresponding to the information to be stored in coils 109–1 to 109–*n* forming one word on the driving coil board.

FIGURE 1*d* is a plan view of a well known semi-permanent memory device. FIGURE 1*e* is a side view of the same device. In both drawings, 101 is a driving coil board and 105 is a sensing coil board. The coils and coil groups on both boards are respectively opposed to each other so as to be in vertical and horizontal relationship with each other. There are provided information storing conductive cards that have numeral 110–1 to numeral 110–*m*. Spacers 111–1 to 111–$(m+1)$ provide clearance between the driving and sensing boards to insert and remove the card and acting also as a guide rail to insert the card correctly in the pre-determined position.

The operating principle of this semi-permanent memory device is as follows. If a pulsed or alternating electric current is made to flow through one of the driving coil groups on the driving coil board, for example driving coil group 104–1, the voltage or current induced in each sensing coil will vary in response to the magnitude of the amount of the electromagnetic coupling which is determined by the presence or absence of a hole. Therefore, the information stored in the card can be electrically sensed in accordance with the magnitude of the electromagnetic coupling. That is to say, the induced voltage or current generated in the sensing coils opposed to each other through the hole made in the card 110 is large and corresponds to sensing an information "1" stored in the conductive card. On the other hand, the induced voltage or current generated in the sensing coil in the part where there is no hole is very small and corresponds to sensing an information "0" stored in the conductive card.

The stored information can be altered easily by interchanging cards having different hole locations.

FIGURES 1*a* and 1*b* described above illustrate a memory module having a memory capacity of *m* words and $m\times n$ bits. By combining a proper number of such memory modules as shown in FIGURES 2*a* and 2*b*, the memory capacity can be increased.

FIGURE 2*a* illustrates only the driving system of the memory device whose memory capacity is increased. In the same drawing, 201–11 to 201–*qp* are respective driving coil boards. The driving coil groups in the same row on the coil board are connected in series. In the drawing, only the connection between the driving coil groups of the boards 201–*ql* to 201–*qp* is illustrated. Further, there is also provided driving electric source 202 and driving selective switches 203–11 to 203–*qm*.

FIGURE 2*b* illustrates only the sensing system of the memory device whose memory capacity is increased. In the same drawing, 205–11 to 205–*qp* are respective sensing coil boards. The respective sensing coils in the same column on the coil board are connected in series. In the drawing, only the connection of the *n*th sensing coils on the sensing coil boards in the first column is illustrated typically. 204–11 to 204–*pn* are sensing selective switches. Sensing information output terminals 206–1 to 206–*n* are also provided.

A memory device having a memory capacity of $m\times p\times q$ words ($m\times n\times p\times q$ bits) can be formed by opposing the respective boards of the driving system and the respective boards of the sensing system illustrated in FIGURE 2*a* in operative association to each other to keep the same relation as shown in FIGURES 1*d* and 1*e*.

For example, in case the information stored in a card inserted in the uppermost row of the memory module formed of the driving coil board 201–11 in FIGURE 2*a* and the sensing coil board 205–11 in FIGURE 2*b* is to be sensed, the driving selective switch 203–11 in FIGURE 2*a* and the sensing selective switches 204–11 to 204–1*n* in FIGURE 2*b* are closed, and the information of *n* bits stored in this card will be obtained at the terminals 206–1 to 206–*n*.

The disadvantages of the above mentioned well known semi-permanent memory device shall be described with reference to FIGURE 3. FIGURE 3 is an equivalent circuit diagram showing only the part directly related with the aforementioned sensing. In the drawing, 301 is a driving coil group consisting of a series connection of *n* driving coils 307–1 to 307–*n* and its return 305. Impedances 303 and 304 are equivalent impedances of series connections of the driving coil group of other words connected to the same driving selective switch as of the one word to be sensed, in case such memory device of a large capacity as in FIGURE 2 is considered. Impedance 303 represents the total impedance of the driving coil group on the side of the terminals on one side of the current source from the word to be sensed. Impedance 304 represents the total impedance of the driving coil group on the side of the other terminals of the current source. Driving current source 302 is also provided. A driving loop is formed of 303, 301 and 304. Sensing loops 306–1 to 306–*n* are formed respectively of many sensing coils and are made by connecting in series sensing coil groups formed respectively of sensing coils 311–1 an 311–*n* and their returns 309–1 to 309–*n*. An information memory card is represented by numeral 310. Hole 308 is located in the card depending on the information to be stored.

Now, if a driving current is made to flow through the sensing loop, the voltage of the card will become a voltage determined primarily by the average voltage of the driving coil group, the electrostatic capacitance between the sensing coil group and the card, and the electrostatic capacitance between an earthed shield plate provided as required. The sum of these voltages and the card will not generally become zero unless the impedances represented by 303 and 304 are equal to each other. On the other hand, as the electrostatic capacitance between the card and the sensing coil and that between the card and the return of the sensing coil are different from each other due to the difference between their shapes, if the voltage of the card is zero, an electric current will be induced in the sensing loop corresponding to the position of the card in which no hole is made and the signal to noise ratio of the sensing signal output will be reduced.

In order to prevent noise by such electrostatic induction coupling, there is considered a method wherein the card is electrically grounded to fix the voltage at zero. However, in such method, whenever the card is replaced to change the information to be stored, it will be necessary to reconnect the ground line to the new card. In order to easily ground the card, there is considered a method wherein a proper resilient electric contact point is used to replace and automatically ground the card. However, in such method, the reliability of the electric contact point will be generally so low and the contact will be so poor that it will be very unlikely that the expected object can easily be attained.

Furthermore, in order to prevent the voltage of the driving coil group from rising, there is considered another method wherein, instead of serially connecting the driving coil groups of all words connected to one driving switch, the driving coil groups are connected in parallel as shown in FIGUURE 4*a*. Another method is to connect the driving coil groups in series through a transformer as shown in FIGURE 4*b* or connect them in parallel and then in series through a transformer as shown in FIGURE 4*c*. However, in the method in FIGURE 4*a*, it is necessary to reduce the impedances of the driving current source and driving selective switch and therefore it will be difficult to form a low impedance current source and switch. Moreover, the parallel connection will render it difficult to make the currents flowing through the respective driving coil group uniform.

Furthermore, in the method in FIGURE 4*b*, the time constant determined by the inductance and resistance of the loop circuit consisting of the primary coil of the transformer connected in series will become so large that the rise of the driving current in the driving coil group will be delayed and high speed sensing operation will not be obtainable. A transformer will also be required for each word and therefore the device will be uneconomical.

The method in FIGURE 4*c* is a compromise between the methods illustrated in FIGURE 4*a* and FIGURE 4*b*. Such a method is not entirely satisfactory as the abovementioned disadvantages are not entirely solved.

The present invention provides a device wherein such various defects of the conventional device as are described above are eliminated. The invention shall be explained in detail in the following description with reference to the indicated drawings.

FIGURES 5*a* and 5*b* show an embodiment of the present invention. FIGURE 5*a* illustrates a driving line board. In the present invention, instead of conventional coils, electrically conductive lines 502–1, each consisting of two parallel conductors electrically balanced with respect to ground, are mounted on an insulative base plate by printed wiring or the like method so that as many zigzag parts as the bits (*n* in the drawing) forming one word may be formed. Such lines are vertically arranged in as many rows as the words to form a driving line board 501.

FIGURE 5*b* illustrates a sensing line board 505 in which, instead of such sensing coil boards as in the conventional device electrically conductive lines 506, each consisting of two parallel conductors electrically balanced with respect to ground, are mounted on an insulative base plate by printed wiring or the like method. The sensing lines are arranged vertically in *n* rows in response to the number of the bits of one word to be stored, and their spacing coincides with the spacings of the zigzag parts of the driving lines on the driving line board. FIGURE 5*c* illustrates a conductive card 510 in which holes are punched to correspond with the information "1."

Furthermore, as the driving and sensing line parts coupled through the hole in this card are straight in this embodiment as shown in FIGURES 5*f* and 5*g*, it is preferable that the shape of the hole is rectangular. Should the "1" bit be *m* times as wide, a continuous hole having a width *m* times as large as the width of the unit may be made. Therefore, the card is easy to make and can be formed smaller than the conventional one in which circular holes are made.

FIGURE 5*d* and FIGURE 5*e* are respectively a plan view and side view of a memory device of the present invention made by assembling the respective component elements shown in FIGURES 5*a*, 5*b* and 5*c*. Therein 501 is a driving line board and 505 is a sensing line board. The vertical parts of the lines on the board 501 are so formed as to be correctly opposed respectively to the lines on the board 505.

Spacers 511–1 to 511–($m+1$) make the clearance between the boards 501 and 505 opposed to each other somewhat larger than the thickness of the card 510 so that it may be easy to insert and remove the card and also act as guide rails for inserting the card correctly into the required position.

In the thus formed semi-permanent memory device according to the present invention, the amount of electric coupling between the driving line and sensing line will be large or small according to the presence or absence of a hole in the card. If a driving current source is balanced with respect to ground, the respective voltages of the two lines constituting a reciprocating line will be of the same absolute values in all the corresponding places along the lines and of opposite polarity to each other. Because the electrostatic capacitance between respective conductors and the card will be the same, the voltage of the card will not be raised by the electrostatic capacitance between the driving line and card, and no noise current will be induced in the sensing line loop corresponding to the part having no hole in the card by the electrostatic capacitance between the card and sensing line. Therefore, even if such method as is explained in FIGURE 4 is not adopted, sensing will be able to be made with a favorable signal to noise ratio.

FIGURES 6*a* and 6*b* illustrate an embodiment of the semi-permanent memory device according to the present invention wherein the memory capacity is increased.

FIGURE 6*a* illustrates a driving system and FIGURE 6*b* illustrates a sensing system. In FIGURE 6*a*, 601–11 to **601–*qp*** are the same driving line boards as are illustrated respectively in FIGURE 5*a* and are arranged in the form of a grid of *p* column and *q* rows. The respective driving lines in the same row in the driving line boards are connected in series, one of the extreme ends of said series connection is terminated with a resistance 609 having a value equal to the surge impedance of the driving line, and the other end is connected to a driving current source 602 through driving selective switches 603–11 to **603–*qm***.

Now, in FIGURE 6*b*, 605–11 to **605–*qp*** are respectively the same sensing line boards as are illustrated in FIGURE 6*a*. The respective sensing lines in the same column on the sensing line board are connected in series. The extreme end of the series connection is terminated with a resistance 607 having a value equal to the surge impedance of the sensing line. The other end is connected to the sensed information output terminals 601–1 to **601–*n* through the sensing selective switch 604–11 to 604–*pn***.

In FIGURE 6*b*, the sensed information output terminals provided to one side of a sensing line are so disposed as to be alternately on the opposite side for successive sensing lines. When the information output terminals are disposed on the near end side of the sensing line with regard to a flow-in direction of a driving current of the corresponding driving line, a larger sensed output voltage or current will be attained than when the terminals are disposed on the far end side of the sensing line, because the electrical coupling between the driving line and the corresponding sensing line in the present invention is a combination of electromagnetic and static couplings. This causes the sensed output voltage whose polarity is additive at the near end side to cancel at the far end side. This is the reason why the sensed output primer in the present invention can be increased relative to the conventional device when only an electromagnetic coupling is utilized.

When driving line boards connected as in FIGURE 6*a* and sensing line boards connected as in FIGURE 6*b* are opposed to each other with a fixed clearance kept between them and cards having holes are inserted in such clearances, a semi-permanent memory device having a memory capacity of $p \times q \times m$ words ($p \times q \times m \times n$ bits) is obtained.

Further, in the present invention, the driving current propagates in a form of traveling wave through the driving line and therefore there is no such reduction of the operating speed by the delay of the rise of the driving current as in the conventional device. The sensing speed is restricted only by the propagation time of the driving current and the sensing current determined by the mechanical structure of the memory block. And so, the operating speed of this memory is higher than the operating speed of the conventional device.

A driving line and a sensing line respectively consisting of two conductors are respectively terminated at an extreme end with a resistance having a value equal to the surge impedance of each line in the embodiment of this invention. Therefore, there is no possibility that a reflected wave will be produced at the far end of the driving line to induce a noise delayed in time to overlap the normal sensing output in the sensing line. There is also no possibility that a reflected wave of the sensing voltage at the end of the sensing line, will disturb the sensing. Thus the sensing operation speed can be increased.

Further, as described above, the propagation times of the driving current in the driving lines and the sensing current in the sensing lines are so short as to present substantially no problem in actual use. But, in case operation at a very high speed is required or the number of the memory modules to be used is so large that the above mentioned propagation times are a problem, the propagation paths of the driving and sensing currents may be shortened by dividing the driving lines and sensing lines into a proper number of groups, connecting one end of each group in parallel and terminating the other end separately with a resistance having a value equal to the impedance of the propagation path.

Then, it is apparent that, unless the output power of the driving current source is increased in response to the number of the divided groups of the driving lines, the same driving current will not be able to be made to flow through each line.

The respective boards illustrated in FIGURES 6*a* and 6*b* can be assembled into one memory block. However, there is a limit to the memory capacity obtained from one memory block. For this purpose, as shown in FIGURES 6*a* and 6*b*, a memory block 608 may be formed of *q* memory units, the connection between the sensing line boards may be carried out within the block. P blocks formed in such manner may be piled up and the driving lines of the respective blocks may be connected between the blocks. Further, when the required memory capacity is so large that it is mechanically difficult to assemble *q* memory units into one block, the *q* memory units may be further divided into a plurality of groups, and the sensing lines of the respective blocks may be connected in series. As another forming method, *p* memory units may be assembled into one memory block, the driving lines may be connected within the block, *q* of such blocks may be assembled and the sensing lines may be connected between the respective blocks. However, in comparing the number of the sensing lines with that of the driving lines in one memory unit, it is found that generally not only the sensing lines are increased but also the connection of the lines is simpler and easier within the block than between the blocks. Therefore, when, as illustrated in FIGURES 6*a* and 6*b*, the sensing lines are connected within the block and the driving lines are connected between tne blocks, the device will be easier to manufacture.

FIGURE 6*c* is a perspective view of a block 608 shown in FIGURES 6*a* and 6*b*. Therein, 601 is a driving line board and 605 is a sensing line board. Information memory card 610 and spacer 611 as well as shield plate 612 are also provided. The driving lines in FIGURE 6*a* are deposited on the side of the driving line board 601 facing the card. The sensing lines in FIGURE 6*b* are deposited on the side of the sensing line board 605 facing the card. Both of these surfaces are opposed to each other with a clearance *d* in which the card 610 can be inserted using the spacers 611 as a guide rail. The lines in the same row of the sensing line boards 605–11 to **605–*ql* are connected in series at the upper side end and lower side end. The terminals of the driving lines are fixed to the driving line board 601** at the back of the illustrated block.

The shield plate 612 is inserted between the memory units so as to electrically shield the memory units forming the block from each other.

In the present embodiment, the memory capacity can be increased by increasing the number of the memory units piled up in a memory block and the number of the blocks used. However, as described above, when a memory device of a very large memory capacity is required and it is mechanically difficult to pile up into one block as many memory units as necessary, sensing lines of a plurality of memory blocks consisting of a proper number of memory units may be connected between the blocks.

As evident also from FIGURES 6*a* and 6*b* the electric connecting points between the line boards in the memory block are numerous. However, if they can be decreased or eliminated, it will be possible to make the manufacture easier and to increase the reliability. For this purpose, instead of making memory units separately and connecting the sensing lines corresponding to the respective memory units, the sensing lines are connected and mounted on a long flexible insulative film by printed wiring or the like method and the flexible film is folded so that the respective layers may be opposed on the driving line board. FIGURE 6*d* is a side view of a memory block formed in such manner. In the drawing, 601 is a driving line board, and 605–1 and 605–2 are sensing line films made by folding the flexible films. Conductive card 610 is for information storage, 611 is a spacer, 612 and 613 are different shield plates and 614 is an insulative plate for providing a required clearance between the sensing line film 605 and the shield plate 612.

Further, in the drawing, the suffixes attached to the numerals 601 and 605 represent the corresponding relationship with the numerals in FIGURES 6*a* and 6*b*. Two sets of sensing line films including 605–11 to **605–*ql* and 605–12** in FIGURE 6*b* to 605–42 are dispersed in the memory block. FIGURE 6*d* corresponds to a combination of the blocks 608–1 and 608–2 in FIGURE 6*b*. That is to say, in FIGURE 6*b*, as the card 610 must be inserted, the terminal cannot be taken out of both ends of the driving line board. Therefore two driving line boards are opposed to each other and the terminal is directly passed through the insulating base plate and is connected to form a driving line board wherein driving lines of two words are connected in series. If such driving line board wherein the ends of the driving lines come out on the same side, as is illustrated in FIGURE 6*a* is used, it will not be necessary to make such formation as is mentioned above. However, such a driving line board is not desirable because a wasteful delay time will be caused in the turned part 503 of the driving line and the number of the terminals required for the driving line board will be twice as large.

When the noise is small, the shield plates 612 and 613 will not always be required to be grounded. Furthermore, for low speed operation, the shield plate 612 between the two driving line boards will not always be required. That is to say, when the shield plate is omitted, the lines on the front and back surfaces of one insulative base plate will be electromagnetically coupled, the driving current will be reflected by the non-uniformity of the driving lines and the information sensing speed will be restricted. But, when this semi-permanent memory device is used at an information sensing speed below the restricted speed, there will be no such problem. In the same manner, the shield plate 613 located between two sensing line films will not always be required. That is to say, when shield plate 613 is omitted, the lines on the front and back surfaces of the insulating plate will be electromagnetically coupled, the sensing current will be reflected by the non-uniformity of the sensing lines and the information sensing speed will be restricted. But, in case this semi-permanent memory device is used below the restricted speed, there will also be no problems. Furthermore, in the case where there are no such shield plates 612 and 613, if any one of the driving lines provided on the driving line boards 601–11 and 601–12 in FIGURE 6*d* is driven, coupling will be produced between 601–12 and each of 605–12, 605–22, 605–32 and 605–42 and between 601–11 and each of 605–12, 605–22, 605–32 and 605–42. But the clearances between 601–12 and 605–12 and between 601–11 and 605–11 are smaller than the other clearances that the output produced by the coupling between 601–12 and 605–12 will be predominant and therefore the stored information in the cards inserted respectively between 601–12 and 605–12 and between 601–11 and 605–11 will be able to be correctly sensed. Only a required one of these informations will be selected by closing the sensing selective switch 604 shown in FIGURE 6*b* and will be led to the output terminals 601–1 to **606–*n***.

The embodiment in FIGURE 6*d* is of a structure wherein such two line boards as the driving line boards 601–11 and 601–12 or 601–21 and 601–22 are arranged opposed to each other.

A set of lines may be printed on one surface of a board corresponding to 601–11, another set of lines may be printed on the other surface of the board corresponding to 601–12 and the corresponding lines on both surfaces may be connected at one end of the card inserting side. Further, a conductive layer may be set as an intermediate layer within the board on both surfaces containing the printed lines so that the layer may act as a shield plate. A flexible insulative film having deposited lines can be made to adhere to a proper insulative base plate so as to present the same effect as if the lines were electrically located on a thick base plate. This flexible insulative film can be made to adhere to an insulative base plate having a metal foil as an intermediate layer so as to present the same effect as if the lines were electrically located on a thick base plate having a shield plate.

FIGURE 6*e* illustrates the structure of a flexible sensing line film to be used in the present device. 615 is a sensing line composed of two conductors. 616 and 617 are flexible plastic films. Said plastic films 616 and 617 are pasted together with the lines 615 between them and form the same structure as of the well known ribbon cable. In the above, the sensing line was formed by using a flexible film. However, it is needless to say that the driving lines can be formed in the same manner.

The information storage card is described as being a metal plate. However, when a hole is made in the metal plate card, both driving and sensing line boards will be scraped off by sharp serrated burrs produced on the periphery of the hole. Therefore, in order to prevent this, it has been necessary to uniformly apply a thick insulative protective painting to each line board or to paste such insulative protective film as of polyester to the board. However, it is very difficult to paint the board with a paint or binder in a uniform thickness.

This defect can be solved by using a card 710 made by coating such metal foil 701 of copper or aluminum having a thickness of several tens of microns on both surfaces with insulators 702 and 703 (such as, for example, paper impregnated with phenol resin) as illustrated in FIGURE 7*a*. That is to say, in the card of this structure, no burr will be produced in case a hole is made and the mechanical strength, resiliency, workability, surface smoothness and surface hardness can be attained with the coating insulator.

When a card made by coating a metal foil 701 on one surface with an insulator 702, removing the metal foil in the required parts by the known etching method or the like depending on the information to be stored and then coating the metal foil on the other surface with an insulator 703 as in FIGURE 7*b* is used, it will be effective to prevent the reduction of the strength of the card caused by making holes.

What is claimed is:

1. A semi-permanent memory device, in combination, comprising:

sensing means mounted on a first insulator base member, driving means mounted on a second insulator base member, the sensing means and the driving means comprising paired parallel spaced conductor elements balanced electrically with respect to a ground reference, the paired conductor elements each being terminated at one end with a resistor equal to the surge impedance of the paired conductor element, the paired conductor elements of the sensing means being parallel to a respective paired conductor element of the driving means at intersecting positions to form storage locations, information storage card means having apertures at positions corresponding to selected ones of the storage locations and consisting of a metal foil base member including insulated coating on both front and back surfaces thereof, the information storage card means being removably mounted in spaced relation between the sensing means and the driving means such that selected paired conductor elements or the sensing means and selected conductor elements of the driving means are coupled at the storage locations formed by the apertures.

2. A semi-permanent memory device according to claim 1 further comprising spacer elements and wherein the paired spaced conductor elements of the sensing means are disposed within the first insulator member consisting of a flexible insulating sheet, the paired spaced conductor elements of the driving means are mounted on the front and rear surfaces of the second insulator base member consisting of an insulative plate, the paired spaced conductor elements of the driving means are connected in series relationship, one of the driving means being disposed between two of the sensing means in spaced relationship thereto to form a memory unit, the insulator base members each having an intermediate conductive layer disposed so as to be interleaved between the memory units, and the information storage means are positioned in the spaces between each driving and each sensing means.

3. The semi-permanent memory device according to claim 1 further comprising spacer elements and wherein the paired conductor elements of the sensing means and the driving means are mounted on one surface of the first and second insulator members, respectively, the insulated base members each being located such that the paired conductor elements of the sensing means and the driving means are opposed in spaced relationship, and the information storage card means are positioned in the spaces between each driving means and each sensing means.

4. A semi-permanent memory device according to claim 3 wherein the first and second insulator base members each include a conductive layer disposed on the outside surface thereof to form a memory unit comprising the sensing means and the driving means.

5. The semi-permanent memory device according to claim 2 wherein the second insulating member includes a conductive layer.

References Cited

UNITED STATES PATENTS

| | | | |
|---|---|---|---|
| 3,176,275 | 3/1965 | Gribble et al. | 340—173 |
| 3,201,767 | 8/1965 | Bradley | 340—174 |

OTHER REFERENCES

Bruce, C.D. et al.: "High Speed Reader," IBM TDB, vol. 4, No. 1, June 1961.

BERNARD KONICK, *Primary Examiner.*

J.. F. BREIMAYER, *Assistant Examiner.*